Dec. 8, 1970   L. F. BLATT ET AL   3,545,050
POWER CLAMP WITH PULL-BACK ACTION
Filed Jan. 30, 1969   2 Sheets-Sheet 2

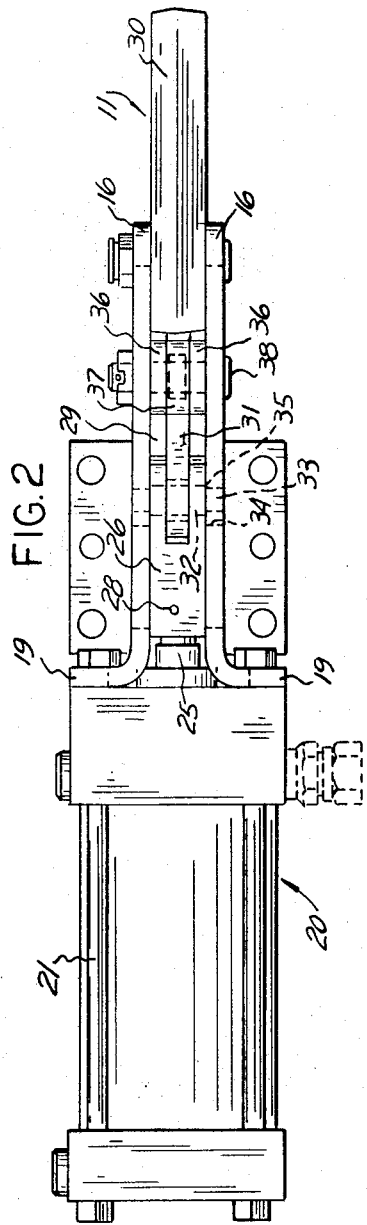
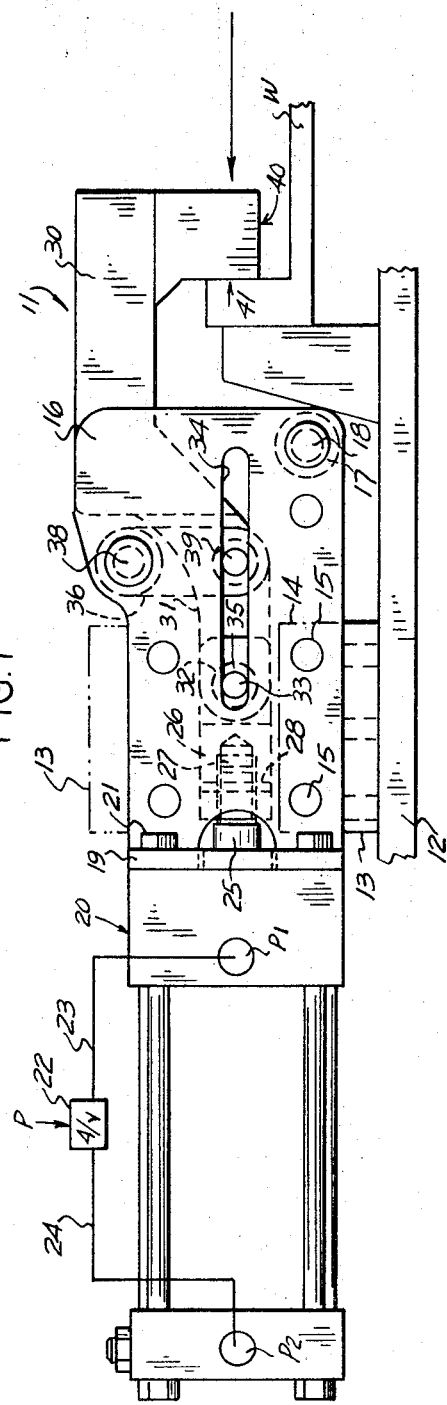

INVENTORS
LELAND F. BLATT
PAUL R. WILLIAMS

BY Cullen, Sloman, & Cantor

ATTORNEYS

United States Patent Office 3,545,050
Patented Dec. 8, 1970

3,545,050
POWER CLAMP WITH PULL-BACK ACTION
Leland F. Blatt and Paul R. Williams, Grosse Pointe Woods, Mich., assignors to I.S.I Manufacturing, Inc., Warren, Mich.
Filed Jan. 30, 1969, Ser. No. 795,202
Int. Cl. B25b 5/08, 5/12
U.S. Cl. 24—248          5 Claims

ABSTRACT OF THE DISCLOSURE

A power clamp with a pull-back action which includes a housing with slotted side plates, a power cylinder on the housing with piston rod extending therein, a clamp arm which is pivotally and guidably mounted intermediate its ends within the housing between "clamping" and "released" position and adjacent one end constrained to reciprocal rectilinear movements and with adapter means on the clamp arm limiting clamping to longitudinal forces coaxial of the piston rod.

BACKGROUND OF THE INVENTION

Heretofore, power clamps have been provided and wherein the clamp normally exerts a clamping pressure as a result of a pivotal movement of the clamping arm and wherein the holding forces are normally exerted at right angles to the axis of the power operated reciprocal controls.

It is an object of the present invention to provide an improved power clamp and wherein the clamping forces are provided to be exerted longitudinally of and in alignment with the reciprocal controls.

It is an object of the present invention to provide within a power operated power clamp a clamping arm which through suitable linkage is constrained for a first pivotal movement between "clamp" and "release" positions and which in clamping position is furthermore constrained to and limited to rectilinear longitudinal compressive movement for providing clamping forces in alignment with the piston rod axis.

Figure 3:
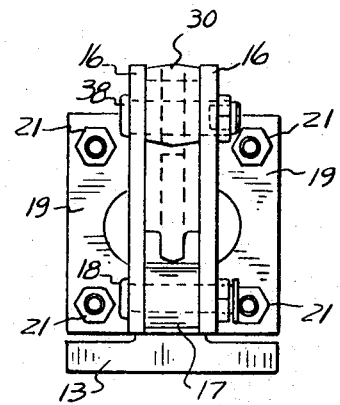
Figure 4:
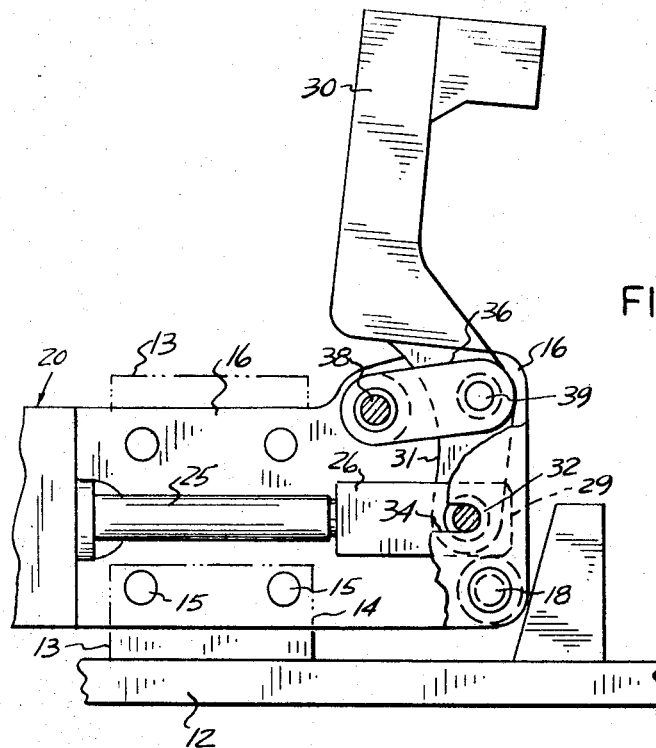

These and other objects will be seen from the following specification and claims in conjunction with the appended drawing in which:

FIG. 1 is a fragmentary partly broken away side elevational view of the present power clamp.
FIG. 2 is a plan view thereof.
FIG. 3 is an end view thereof.
FIG. 4 is a fragmentary view similar to FIG. 1 showing the clamp arm and related parts in "release" position.

DETAILED DESCRIPTION

Referring to the drawing, the present power clamp with pull-back action is designated generally at 11 and is mounted upon support 12 fragmentarily shown employing for illustration mounting block 13 of general rectangular shape in cross section and which is provided with a series of apertures to facilitate anchoring to said support. Said mounting block includes a right angular riser 14 of rectangular cross section which snugly extends between housing side plates 16 and is fixedly secured thereto by fasteners 15.

The power clamp housing includes the upright parallel side plates 16 spaced apart at their one ends by spacer block or disc 17 fixed in position by bolt 18. The width of the spacer provides a means of regulating the spacing between the side plates 16 with respect to the guiding and support function hereafter described with respect to the clamping arm 30.

Instead of the mounting block 13 with riser 14, the present housing could be fastened directly to any form of suitable riser plate.

As shown in FIGS. 2 and 3, side plates 16 at their ends have out turned right angular flanges 19 which are apertured to receive the assembly bolts 21 for securing the power cylinder 20 to and at one end of and in alignment with said housing.

The present power cylinder 20 is preferably pneumatic and includes a conventional piston rod 25 adapted for reciprocal movements, which rod projects into and between plates 16 of said housing as best shown in FIGS. 1 and 2.

The respective heads of the cylinder are provided with pressure ports P1 and P2 which are connected to a conventional air pressure supply four-way valve 22 by the respective conduits 23 and 24. Elongated rod end 26 as shown in FIG. 2 is guidably nested between side plates 16 and at one end includes a bore 27 which cooperatively and sungly receives free end of piston rod 25 which is further fixed in position by the transverse pin 28. The rod end 26 includes a longitudinally extending fork 29 which is constrained to rectilinear guided reciprocal movements between the side plates 16.

The pivotal clamp arm 30 is snugly and guidably interposed between side plates 16, FIGS. 1 and 3 and has a rearwardly extending reduced arm 31 which projects longitudinally of the housing and adjacent to its end is pivotally connected to rod end fork 29 by pivot pin 32, FIGS. 1 and 2. End portions of pin 32 are reduced at 33 defining the shoulders 35, FIG. 2.

Said pivot pin end portions 33 are guidably and movably positioned within the opposed pair of elongated slots 34 which are formed within the respective side plates 16 for constraining longitudinal movements of the pivot pin 32 and the connected portion of the clamp arm 31 to rectilinear movements.

The said slots 34 are in registry with the longitudinal axis of the piston rod 25.

The shoulders 35 defined within pivot pin 32 are of such dimension as to cooperatively register with the internal surfaces of side plates 16 to thus prevent accidental disassembly of the pivot pin 32 from the fork and connected clamp arm extension 31.

A pair of links 36 are pivotally suspended or mounted within said housing in cooperative sliding engagement with the interior walls of said side plates by means of the adjacent pivot bolt 38 with associated nut and cotter pin. Spacer 37 is mounted upon the pivot bolt and occupies the space between the respective links 36. The respective lower ends of said links engage opposite sides of the power clamp arm extension 31 and are pivotally connected thereto by the pivot pin 39.

Various types of adapter plates 40 are suitably secured upon one side of the clamp arm 30 such as shown in FIG. 1 and is provided with clamping surface 41 which is adapted to transmit clamping forces in the direction of the arrow shown; namely, coaxial of the piston rod 25.

OPERATION

With the four-way valve 22 schematically shown as receiving a source of fluid under pressure such as compressed air, the clamp arm 30 and associated adapter 41 is shown in solid lines in normal clamping position and wherein port P1 is pressurized to maintain the rod end 26 in the rear most position shown at FIG. 1. By actuating the four-way valve port P1 is connected with exhaust and port P2 is pressurized causing a forward longitudinal movement of piston rod 25 and the connected rod end 26 with fork 29. This forward movement causes a corresponding rectilinear forward movement of the rear end of the arm extension 31; is controlled and constrained by pivot pin 32 which rides within the side plate slots 34. A forward intermediate portion of the clamp arm extension 31 in view of its pivotal connection 39 with the fixed pivotal links 36 with respect to the fixed pivot 38 limits clamp arm travel to an arc such as shown in FIGS. 1 and 4 which may be controlled by the relative spacing of the pivot points as well as the length of the slots 34.

With the control mechanism in a forward position the opening of arm 30 is controlled by the stroke of the cylinder and the length of the slots 34 in side plate 16.

It appears that there is some mechanical advantage present in a direction transverse to the longitudinal axis of the piston rod. In the present disclosure, however, the clamping force is essentially in the direction of the arrow shown with respect to FIG. 1; namely, longitudinally of the housing and coaxial of the piston rod axis.

By the use of a desired adapter 40-41 for a particular clamping purpose, the transverse mechanical advantage is therefore negligible since the clamping forces being longitudinal are based essentially upon the fluid pressure provided against the rod side of the piston within the power cylinder taking into consideration the piston area less the area of the piston rod.

One advantage of the present clamping system becomes apparent wherein it appears that different length clamping arms 30 may be employed for particular clamping purpose, without any loss of clamping pressure throughout the complete mechanism.

The side plates show additional transverse apertures by which the mounting block may be moved longitudinally of the side plates as desired for a particular clamping job or alternately, the mounting block could take the position as designated in dotted lines, FIG. 1. If a mounting block or extension is employed which would normally occupy a portion of the space shown by the spacer 17, then in that case that spacer can be eliminated since the riser portion of the mounting block performs the same function.

Having described our invention, reference should now be had to the following claims.

We claim:
1. A power clamp with pull-back action comprising:
   a housing including a pair of spaced interconnected side plates mounted upon a support;
   a power cylinder longitudinally aligned with and secured to one end of said housing including a reciprocal piston rod extending axially into the housing;
   there being opposed elongated slots extending into the side plates in registry with the piston rod axis;
   a rod end longitudinally reciprocal fork guidably mounted between the side walls and secured to the piston rod;
   a clamp arm guidably positioned between the side plates and projecting outwardly of the housing longitudinally when in "clamp" position and substantially at right angles to the piston rod in "release" position;
   said clamp arm extending longitudinally into said fork;
   a pivot pin interconnecting said fork at one end of said arm, and at its ends guidably and movably nested in said slots;
   and a link pivotally mounted at one end upon and within the housing spaced from the piston rod axis and at its other end pivotally connected to said clamp arm intermediate its ends;
   said clamp arm including an adapter on its free end having a workpiece engaging surface at right angles to and in registry with the piston rod axis, for exerting a clamping force in alignment with said axis.

2. In the power clamp of claim 1, said housing including a first spacer between said side plates and secured thereto;
   there being a pair of said links including the first mentioned link and bearing upon opposite sides of said arm and against said plates;
   the pivot mounting of said links including a pivot bolt extending through the links and side plates;
   and a second spacer on said bolt filling the space between said links.

3. In the power clamp of claim 1, said clamp arm pivot pin moving from one end to the other of said side plate slots as the clamp arm pivots from "clamp" to release" positions;
   the length of said slots being variable to determine the throw of said clamp arm.

4. In the power clamp of claim 1, the housing side plates at one end terminating in right angular outturned apertured flanges;
   the mounting of the power cylinder including bolts securing the cylinder against said flanges.

5. In the power clamp of claim 1, the support mounting said housing including an elongated apertured mounting block, transverse to and supportably engaging the adjacent edges of said side plates;
   and a riser flange of rectangular cross section on said block projecting between the side plates and secured thereto.

References Cited

UNITED STATES PATENTS 2,574,281  11/1951  Olson _____ 269—228X
3,347,542  10/1967  Mericle _____ 269—228X

FOREIGN PATENTS 821,132  9/1959  Great Britain.

DONALD A. GRIFFIN, Primary Examiner

U.S. Cl. X.R.

269—228, 233